(12) United States Patent
Colmenares et al.

(10) Patent No.: US 11,389,785 B2
(45) Date of Patent: Jul. 19, 2022

(54) METHOD FOR OBTAINING MESOPOROUS SILICA PARTICLES WITH SURFACE FUNCTIONALIZATION

(71) Applicant: TECHNISCHE UNIVERSITÄT BERLIN, Berlin (DE)

(72) Inventors: Maria Colmenares, Berlin (DE); Tomos Harris, Berlin (DE); Javier Silva Mora, Berlin (DE); Julien Sialelli, Berlin (DE)

(73) Assignee: TECHNISCHE UNIVERSITÄT BERLIN, Berlin (DE)

( * ) Notice: Subject to any disclaimer, the term of this patent is extended or adjusted under 35 U.S.C. 154(b) by 7 days.

(21) Appl. No.: 16/964,538

(22) PCT Filed: Jan. 24, 2019

(86) PCT No.: PCT/EP2019/051752
§ 371 (c)(1),
(2) Date: Jul. 23, 2020

(87) PCT Pub. No.: WO2019/145421
PCT Pub. Date: Aug. 1, 2019

(65) Prior Publication Data
US 2021/0031172 A1 Feb. 4, 2021

(30) Foreign Application Priority Data
Jan. 24, 2018 (EP) .................................... 18153192

(51) Int. Cl.
*B01J 21/08* (2006.01)
*B01J 37/00* (2006.01)
(Continued)

(52) U.S. Cl.
CPC .............. *B01J 21/08* (2013.01); *B01J 37/009* (2013.01); *B01J 37/0018* (2013.01); *B01J 37/04* (2013.01);
(Continued)

(58) Field of Classification Search
CPC ...... B01J 21/08; B01J 37/0018; B01J 37/009; B01J 37/04; B01J 37/06; B01J 37/10;
(Continued)

(56) References Cited

U.S. PATENT DOCUMENTS 5,145,816 A 9/1992 Beck et al.
2004/0229751 A1 11/2004 Pinnavaia
(Continued)

FOREIGN PATENT DOCUMENTS

EP 2 282 973 A2 2/2011
WO 2006094392 A1 9/2006

OTHER PUBLICATIONS

Brunelli et al., "Cooperative Catalysis with Acid-Base Bifunctional Mesoporous Silica: Impact of Grafting and Co-condensation Synthesis Methods on Material Structure and Catalytic Properties", Chem. Mater. 24 (Jun. 11, 2012) 2433-2442.
(Continued)

*Primary Examiner* — Brian A McCaig
(74) *Attorney, Agent, or Firm* — Maschoff Brennan

(57) ABSTRACT

It is provided a method for obtaining mesoporous silica particles with surface functionalisation comprising the steps of a) providing solutions of at least three precursors; wherein the pH of the mixture is adjusted to a range between 2 and 8 in a buffered system; b) Mixing the precursor solutions thereby allowing a reaction to take place at a temperature between 20 and 60° C., whereby surface functionalized mesoporous silica particles as solid reaction product are formed; c) Separating the surface functionalized mes-
(Continued)

oporous silica particles from the reaction mixture by centrifugation or filtration; d) Removing any pore structure directing agent present in the pores of the formed surface functionalized mesoporous silica particles by ultrasonication; e) followed by separation by centrifugation or filtration, washing and drying of the surface functionalized mesoporous silica particles.

15 Claims, 8 Drawing Sheets

(51) Int. Cl.
| | | |
|---|---|---|
| | *B01J 37/04* | (2006.01) |
| | *B01J 37/06* | (2006.01) |
| | *B01J 37/10* | (2006.01) |
| | *B01J 37/34* | (2006.01) |
| | *C01B 33/193* | (2006.01) |

(52) U.S. Cl.
CPC ............... *B01J 37/06* (2013.01); *B01J 37/10* (2013.01); *B01J 37/343* (2013.01); *C01B 33/193* (2013.01)

(58) Field of Classification Search
CPC ..... B01J 37/343; B01J 29/0308; C01B 33/18; C01B 33/193; C01B 37/02
See application file for complete search history.

(56) References Cited

U.S. PATENT DOCUMENTS

| | | | |
|---|---|---|---|
| 2006/0034924 A1 | 2/2006 | Wyrsta et al. | |
| 2008/0175783 A1 | 7/2008 | Park | |
| 2009/0036297 A1* | 2/2009 | Crudden | ............... B82Y 30/00 502/158 |
| 2009/0311332 A1 | 12/2009 | DeShong et al. | |
| 2013/0177934 A1 | 7/2013 | Wiesner et al. | |

OTHER PUBLICATIONS

Colmenares et al. "Oxidative coupling of methane on the Na2WO4-MnxOy catalyst: COK-12 as an inexpensive alternative to SBA-15." Catalysis Communications 85 (Jun. 27, 2016) 75-78.

Colmenares, M. G. et al. "Batch and continuous synthesis upscaling of powder and monolithic ordered mesoporous silica COK-12." Microporous and Mesoporous Materials 256 (Jan. 15, 2018) 102-110.

Fritz-Popovski, G. et al. "Pore shape and sorption behaviour in mesoporous ordered silica films." Journal of Applied Crystallography 49 (Aug. 25, 2016) 1713-1720.

Goebel, Ronald. Hybridmaterialien aus mesoporösen Silica und ionischen Flüssigkeiten. Jan. 25, 1982.

Jammaer, J. et al. "Continuous Synthesis Process of Hexagonal Nanoplates of P6m Ordered Mesoporous Silica." J. Am. Chem. Soc. 133 (Jul. 26, 2011) 13737-13745.

Li et al. "Functionalization of Mesoporous SBA-15 with APTES by Co-Condensation and its Effect on Immobilization of Candida rugosa Lipase", Key Eng. Mater. 645-646 (May 18, 2015) 1261-1266.

Margolese et al., "Direct Syntheses of Ordered SBA-15 Mesoporous Silica Containing Sulfonic Acid Groups", Chem. Mater. 12 (Aug. 3, 2000) 2448-2459.

Sujandi et al., "Base catalysis via amine-functionalized mesoporous silicas with various structural phases", Stud. Surf. Sci. Catal. 170 (Aug. 12, 2007) 1446-1453.doi:10.1016/S0167-2991(07)81014-7.

Sujandi et al. "Microwave synthesis of large pored chloropropyl functionalized mesoporous silica with p6mm, Ia-3d, and Im3m structures," Microporous Mesoporous Mater. 118 (Aug. 24, 2009) 134-142.

Tsai et al., "A simple one-pot route to mesoporous silicas SBA-15 functionalized with exceptionally high loadings of pendant carboxylic acid groups", Chem. Commun. (Sep. 7, 2009) 5018-5020.

Wang et al., "Direct Synthesis and Catalytic Applications of Ordered Large Pore Aminopropyl-Functionalized SBA-15 Mesoporous Materials" J. Phys. Chem. 109 (Jan. 14, 2005), 1763-1769.

Wang, Y.-Q. et al. "Fabrication of highly ordered mesoporous silica with the assistance of phosphate." New J. Chem. 39 (Aug. 13, 2015) 7763-7767.

Wang, X. et al. "Synthesis of Ordered Mesoporous Silica with Tunable Morphologies and Pore Sizes via a Nonpolar Solvent-Assisted Stöber Method." Chem. Mater. 28 (7) Mar. 15, 2016: 2356-2362.

Wilke, T. et al. "Mesoporöse Silica. Moderne Funktionsmaterialien im Chemieunterricht." CHEMKON 19 (Mar. 15, 2012) 67-72.

Yoshitake, H., "Design of functionalization and structural analysis of organically-modified siliceous oxides with periodic structures for the development of sorbents for hazardous substances," J. Mater. Chem. 20 (Apr. 21, 2010) 4537-4550.

Sujandi et al. "Amino-functionalized SBA-15 typemesoporous silica having nanostructured hexagonal platelet morphology" ChemComm, Aug. 22, 2006, 4131-4133.

Shaghayegh Jabariyan et al: "A simple and fast sonication procedure to remove surfactant templates from mesoporous MCM-41", Ultrasonic: Sonochemistry Butterworth-Heinmann, GB, V. 19 N. 5, Jan. 25, 2012.

Robert J. P. Corriu et al: "Direct syntheses of fictionalized mesostructured silica by using an inexpensive silica source" Chemical Communications, Jan. 1, 2004.

Shah J et al: "Thiol-functionalized mesostructured silica vesicles" Chemical Communications, Royal Society of Chemistry, GB, Jan. 1, 2005.

* cited by examiner

METHOD FOR OBTAINING MESOPOROUS SILICA PARTICLES WITH SURFACE FUNCTIONALIZATION

CROSS-REFERENCE TO A RELATED APPLICATION

This application is a National Phase Patent Application of International Patent Application Number PCT/EP2019/051752, filed on Jan. 24, 2019, which claims priority of European Patent Application Number 18 153 192.2, filed on Jan. 24, 2018.

BACKGROUND

The disclosure relates to a method for obtaining mesoporous silica particles with surface functionalisation.

Mesoporous silica materials possess attractive characteristics such as large surface areas and well-defined ordered pores of controlled size that are the result of templating with organic molecules.

Extensive efforts are being made to use solid, heterogeneous catalysts, or to immobilize homogeneous catalysts onto solid support materials. Research has shown that ordered mesoporous silica (OMS) materials are exceptionally effective solid supports. Ordered mesoporous silica is a silica material with unique properties, namely large surface areas and well-defined ordered pores of tuneable size, usually ranging from 2 to 50 nm (contrary to silica gel, which has a disordered pore structure).

To date, only a few reports concerning large-scale production of these materials exist, given that mesoporous silica materials synthesis upscaling can be problematic due to the harsh synthesis environment required. Common mesoporous silica materials syntheses are often carried out at low or high pH, and require long synthesis and aging times at elevated temperatures, which leads to long synthesis time and high energy consumption.

Aside from large-scale production of OMS, processes that require the use of larger particulate mesoporous silica materials have driven the need to produce a material with particles within the micron range, as opposed to powders. Investigations regarding the preparation of OMS in various macroscopic configurations have led to the fabrication of films and bulk materials (monoliths) as an alternative to powders. The direct synthesis of OMS granules circumvents the necessity for post-processing of powders to produce granules, representing a decrease in the overall cost of production in terms of time and energy.

Functionalisation of the surface further increases the value of the material and can be done with silylating reagents (hereby referred to as the functionalising agents) that possess organic terminal groups, yielding surface-functionalised ordered mesoporous silica (SF-OMS).

One approach for functionalising silica particles is the co-condensation method. Here, the synthesis of SF-OMS materials using triblock copolymers as structure directing agents (SDAs) has also been reported via a co-condensation route in which the three precursors are mixed together. The gel is aged at high temperatures and the SDA removed by solvent extraction in acid, alcohol or acid-alcohol mixtures at high temperatures. The most commonly used silica precursor in this route is tetraethyl orthosilicate (TEOS), an expensive precursor. However, few publications report the use of sodium silicate solutions. In either case, strongly acidic solutions are always used (normally HCl), and aging of the gel is always carried out for extended periods of time at high temperatures (80-130° C.).

Hence, functionalisation typically takes place under harsh conditions, high temperatures and using toxic organic solvents, and requires multiple steps. Thus, there is a lack of technological capabilities for the large-scale, inexpensive and more environmentally-friendly production of SF-OMS materials.

Silica materials have also been shown to exert metal scavenging activity. Metal catalysts, such as the platinum group metals (PGM), are widely used to carry out an extensive range of complex coupling reactions during early stage research through to full scale manufacturing of active pharmaceutical ingredients (APIs). PGMs include ruthenium (Ru), rhodium (Rh), palladium (Pd), osmium (Os), iridium (Ir) and platinum (Pt). The removal of residual metals APIs is a major concern for the pharmaceutical industry, which is regulated under very strict legislation to ensure that traces of metals in drug products never reach the patient. The oral PDE (permitted daily exposure) for palladium has been set at 2 microg/kg/day in a 50 kg person, and the permitted limits in APIs will continue to decline. On the other hand, there is a great economic interest in recovering and reusing precious metals such as palladium, which are expensive and scarce.

The traditional methods for metal removal, such as activated carbon adsorption, crystallisation, extraction and distillation) have drawbacks, such as significant loss of product, reaction vessel contamination, failure to remove metals to desired levels, and poor reproducibility, resulting in great economic disadvantages for chemical manufacturers. Therefore, the search for alternative technologies to effectively remove metal traces is of major interest.

A wide range of advanced metal scavengers have been commercialised as an alternative to traditional methods and materials for the removal of metal traces from reaction mixtures. Activated carbon and bare silica gels are widely used albeit their poor selectivity, and polymer-based materials suffer from swelling in organic solvents and leaching of the functional group. Recently, functionalised silica gels have emerged as powerful scavengers due to improved chemical stability of the silica matrix. Selected examples include Quadrasil (Johnson Matthey), ISOLUTE (Biotage), SiliaMetS (SiliCycle Inc.) and Phos (Phosphonics Ltd.).

However, SF-OMS materials have the potential to access the market as superior alternatives to silica gel-based scavengers. The ordered structure of SF-OMS results in better uniformity and accessibility of functional groups and improved mass transport properties over the silica gel analogs, while exhibiting the same robustness of the silica matrix. Furthermore, SF-OMS have a higher resistance to swelling in solvents, higher resistance to leaching of functional groups, and higher thermal stability compared to resins and polymer-based scavengers. These properties make of SF-OMS attractive materials for the cost-effective removal and recovery of palladium species from reaction mixtures.

Different SF-OMS materials synthesised by state-of-the-art methods (post-grafting and co-condensation) have been reported as metal scavengers for different metals in different media. In particular, SBA-15 type of materials are widely reported.

Silica materials have been used to support organocatalysts. The resulting solid catalysts have been used in a wide range of chemical transformations, including acid-catalysed reactions, such as esterifications, etherification, dehydration, oxidation and acetylation reactions; base-catalysed reactions, such as aldol and Knoevenagel condensations, as well as Michael additions; enantioselective additions; and Diels-Alder reactions. Furthermore, silica materials have also been used as catalyst supports for the immobilisation of stabilisation of organometallic catalytic species, metal nanoparticles and enzymes. The resulting immobilised catalysts have been used in reactions such as C—C bond formation reactions, selective oxidations, selective hydrogenations, Knoevenagel condensations and enantioselective nucleophilic additions.

SF-OMS materials have the potential to access the market as alternatives to silica gel-based catalysts. The ordered structure of SF-OMS results in better uniformity and accessibility of the catalytic species and improved mass transport properties, resulting in higher catalytic performance over the silica gel-based catalysts.

Different SF-OMS materials have been reported either as solid catalysts or as catalyst supports. However, these SF-OMS materials have been synthesised by state-of-the-art methods (post-grafting and co-condensation). In particular, SBA-15 type of materials are widely reported.

SUMMARY

In view of the above drawbacks in the large scale production of mesoporous silica it was an object underlying the proposed solution to provide a process for obtaining surface-functionalized ordered mesoporous silica (SF-OMS) at low costs and in an environmentally friendly manner that also allows for a continuous synthesis.

This object is solved by a method for obtaining mesoporous silica particles with surface functionalisation as described herein.

Accordingly, a method for obtaining mesoporous silica particles with surface functionalisation is provided, the method comprising the steps of
a) Providing solutions of at least three precursor agents wherein the at least three precursor agents are selected from a group containing:
   at least one alkali silicate solution,
   at least one solution containing at least one pore structure directing agent (SDA), and
   at least one agent for surface functionalisation;
wherein the pH of the mixture is adjusted to a range between 2 and 8 in a buffered system;
b) Mixing the precursor solutions thereby allowing a reaction to take place at a temperature between 20 and 60° C., preferably between 20° C. and 25° C., whereby surface functionalized mesoporous silica particles as solid reaction products are formed;
c) Separating the surface functionalized mesoporous silica particles from the reaction mixture by centrifugation or filtration and optionally washing the surface functionalized mesoporous silica;
d) Removing any pore structure directing agent present in the pores of the formed surface functionalized mesoporous silica particles by ultrasonication at a temperature between 20° C. and 60° C., preferably between 20° C. and 50° C., more preferably between 20° C. and 30° C.;
e) followed by separation by centrifugation or filtration, washing and drying of the surface functionalized mesoporous silica particles.

The innovative method for synthesizing SF-OMS is carried out by mixing (either by stirring for batch, or static mixing for continuous) of three precursor solutions at room temperature: (i) a silica precursor solution (sodium silicate, sodium hydroxide and water), (ii) a pore structure directing agent (SDA) solution, and (iii) a functionalising agent. After mixing, the immediate formation of a solid is observed. Organofunctional silica mesostructures form instantly under the conditions applied in the present process when two streams of the reactants are mixed at room temperature, which is crucial for a continuous synthesis process, compared to the conventional templating process at high temperatures and long times, as for example described in US 2004/0229751 A1.

An optional aging step for up to 48 hours between 20° C. to 100° C. may follow, however this is not necessarily required. This solid is then separated by centrifugation or filtration, washed with water, and dried in air. After drying, the SDA is removed from the pores of the material by ultrasonication, for example with methanol at room temperature. The material is then filtered, washed with water, dried and collected.

Thus, a method for a one-pot batch synthesis or a continuous synthesis of SF-OM materials is provided that is conducted in water and at room temperature. The nature of the synthesis (i.e. immediate solid formation upon mixing of reagents) makes a continuous synthesis feasible.

In conventional methods, the synthesis takes place in strongly acidic solutions (such as HCl) or organic solvents, at high temperature and cannot be carried out in continuous mode. In particular, the present method does not require a calcination step at high temperature. In one embodiment of the present method there is no organic solvent used in the reaction mixture (i.e. the reaction mixture is free of any organic solvent). Additionally, no emulsifying agent is required to produce the surface functionalised silica.

Furthermore, the method according to the solution uses a mild buffered solution, such as citric acid/citrate (pH 5-6), which controls the silica condensation rate to allow the instant formation of SF-OMS with an ordered morphology and pore structure. An aging step at high temperatures is not necessary to achieve the crystallization of the mesophase.

The present process has important economic and environmental improvements and therefore solves a problem by providing a cost- and time-efficient process that can easily be scaled-up. This is in particular due to the low reaction temperature and the removal of the pore structure directing agent by ultrasonication. In contrast, the removal of the structure-directing agent by soxhlet extraction (as described for example in US 2004/0229751 A1) requires the use of high temperature, with the minimum being the boiling point of the extracting solvent, and is usually carried out for at least 12 hours. In the case of ultrasonic template removal, such high temperatures can be avoided, using instead temperatures around room temperature at a shorter time.

As mentioned above, according to the present method, an alkali silicate solution is used as silica precursor solution. In an embodiment of the present method sodium silicate ($Na_2SiO_2$ or $Na_2SiO_3$, CAS numbers 1344-09-8 and 6834-92-0, respectively) solution is used. It is preferred, if the at least one silica precursor solution comprises the alkali silicate in an amount between 20 and 40 wt %, preferably between 25 and 35 wt %, in particular preferably between 27 and 30 wt % of $SiO_2$, and 5-30 wt %, preferably 10-20 wt %, most preferably 14% of NaOH. In a specific embodiment the silica precursor solution comprises 27% SiO2 and 14% NaOH.

In another embodiment the at least one pore structuring directing agent is a non-ionic polymeric pore structuring directing agent (SDA) from the group of poly(alkylene oxide)triblock copolymer. It is preferred, if at least one pore structuring directing agent is HO(CH$_2$CH$_2$O)$_{20}$(CH$_2$CH(CH$_3$)O)$_{70}$(CH$_2$CH$_2$O)$_{20}$H (Pluronic P123). The pore structuring directing agents preferably used in the present process are also known as Poloxamers.

Poloxamers are nonionic triblock copolymers composed of a central hydrophobic chain of polyoxypropylene (poly(propylene oxide)) flanked by two hydrophilic chains of polyoxyethylene (poly(ethylene oxide)). Poloxamers are also known by the trade names Synperonics, Pluronics, and Kolliphor.

Because the lengths of the polymer blocks can be customized, many different poloxamers exist that have slightly different properties. For the generic term "poloxamer", these copolymers are commonly named with the letter "P" (for poloxamer) followed by three digits: the first two digits ×100 give the approximate molecular mass of the polyoxypropylene core, and the last digit ×10 gives the percentage polyoxyethylene content (e.g. P407=poloxamer with a polyoxypropylene molecular mass of 4,000 g/mol and a 70% polyoxyethylene content). For the Pluronic and Synperonic tradenames, coding of these copolymers starts with a letter to define its physical form at room temperature (L=liquid, P=paste, F=flake (solid)) followed by two or three digits, The first digit (two digits in a three-digit number) in the numerical designation, multiplied by 300, indicates the approximate molecular weight of the hydrophobe; and the last digit ×10 gives the percentage polyoxyethylene content (e.g., L61 indicates a polyoxypropylene molecular mass of 1,800 g/mol and a 10% polyoxyethylene content).

In one variant, at least one pore structuring directing agent is provided in a buffer solution with a pH between 2 and 8, preferably 5 to 7. Typical buffer solutions that may be used are a sodium citrate/citric acid buffer, a Na$_2$HPO$_4$/citric acid buffer, a HCl/sodium citrate buffer or a Na$_2$HPO/NaH$_2$PO$_4$ buffer. A sodium citrate/citric acid buffer is particular preferred. The control of the pH of the reaction mixture provides quasi-neutral conditions that are critical for the immediate synthesis of the materials (thus allowing synthesis in continuous mode).

In an most preferred embodiment the sodium citrate/citric acid buffer has a sodium citrate:citric acid weight ratio in the range of 0.10:1 to 3.3:1. The buffer system may contain 3.684 g citric acid and 2.540 g sodium citrate.

The above buffer solution, in which the pore structuring agent is provided, provides also for the buffering system in the reaction mixture.

The concentration of the at least one pore structure directing agent in the buffer solution is between 2 and 10 wt % (based on the total solution), preferably 4 and 8 wt %, more preferably 4 and 5 wt %.

In yet another embodiment the at least one surface functionalisation agent may be of the following general structure:

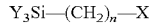

wherein
Y is OR$^1$, wherein R can be a H or an alkyl chain, in particular a substituted or non-substituted C1-C20 alkyl chain,
n is 1 to 20,
X is selected from a group comprising H, a linear or branched substituted or non-substituted C$_1$-C$_{30}$-alkyl or a cyclic substituent in form of a substituted or non-substituted C$_5$-C$_{20}$-cycloalkyl, a substituted or non-substituted C$_5$-C$_{20}$-aryl, wherein in each case one or multiple carbon atoms can be substituted by one or multiple oxygen atoms, sulphur atoms, substituted nitrogen atoms, double bonds and/or by one or multiple groups of the type —C(O)O—, —C(O)—, —C(O)—H, —NHC(O)O—, —OC(O)NH— and/or —OC(O)O—, and/or can be functionalized by one or multiple hydroxyl groups, amino groups and/or mercapto groups, In an embodiment the functional group X can be selected from a group comprising H, substituted and non-substituted C$_1$-C$_{12}$-alkyl, substituted and non-substituted C$_3$-C$_7$-cycloalkyl.

The term "substituted" in connection to alkyl, cycloalkyl relates to the substitution of one or more atoms, usually H-atoms, by one or more of the following substituents: halogen, hydroxy, protected hydroxy, oxo, protected oxo, C$_3$-C$_7$-cycloalkyl, phenyl, naphthyl, amino, protected amino, primary, secondary or tertiary amino, heterocyclic ring, imidazolyl, indolyl, pyrrolidinyl, C$_1$-C$_{12}$-alkoxy, C$_1$-C$_{12}$-acyl, C$_1$-C$_{12}$-acyloxy, nitro, carboxy, carbamoyl, carboxamid, N—(C$_1$-C$_{12}$-alkyl)carboxamid, N,N-Di(C$_1$-C$_{12}$-alkyl)carboxamid, cyano, methylsulfonylamino, thiol, C$_1$-C$_{10}$-alkylthio and C$_1$-C$_{10}$-alkylsulfonyl. The substituted groups can once or twice substituted with same or different substituents.

Examples for the above substituted alkyl groups comprise 2-oxo-prop-1-yl, 3-oxo-but-1-yl, cyanomethyl, nitromethyl, chlormethyl, hydroxymethyl, tetrahydropyranyloxymethy, trityloxymethyl, propionyloxymethyl, aminomethyl, carboxymethyl, allyloxycarbonylmethyl, allyloxycarbonylaminomethyl, methoxymethyl, ethoxymethyl, t-butoxymethyl, acetoxymethyl, chlormethyl, brommethyl, iodmethyl, trifluormethyl, 6-hydroxyhexyl, 2,4-dichlor(n-butyl), 2-aminopropyl, 1-chlorethyl, 2-chlorethyl, 1-bromethyl, 2-bromethyl, 1-fluorethyl, 2-fluorethyl, 1-iodethyl, 2-iodethyl, 1-chlorpropyl, 2-chlorpropyl, 3-chlorpropyl, 1-brompropyl, 2-brompropyl, 3-brompropyl, 1-fluorpropyl, 2-fluorptopyl, 3-fluorpropyl, 1-iodpropyl, 2-iodpropyl, 3-iodpropyl, 2-aminoethyl, 1-aminoethyl, N-benzoyl-2-aminoethyl, N-acetyl-2-aminoethyl, N-benzoyl-1-aminoethyl, N-acetyl-1-aminoethyl and alike.

The term "C$_1$-C$_{12}$-alkyl" relates to moities like methyl, ethyl, n-propyl, isopropyl, n-butyl, isobutyl, s-butyl, t-butyl, amyl, t-amyl, hexyl, heptyl, octyl, nonyl, decyl, undecyl, dodecyl, and alike. Preferred C$_1$-C$_{12}$-alkyl groups are methyl, ethyl, isobutyl, s-butyl und isopropyl.

The term "oxo" relates to a carbon atom, which is connected with an oxygen atom via a double bond whereby a keto or an aldehyde group is formed. The term "protected oxo" relates to a carbon atom, which is substituted by two alkoxy groups or is connected twice with a substituted diol forming a non-cyclic or cyclic ketal group.

The term "alkoxy" relates to moities like methoxy, ethoxy, n-propoxy, isopropoxy, n-butoxy, t-butoxy and alike. A preferred alkoxy group is methoxy.

The term "C$_3$-C$_7$-cycloalkyl" comprises groups like cyclopropyl, cyclobutyl, cyclopentyl, cyclohexyl und cycloheptyl. The term "C$_5$-C$_7$-Cycloalkenyl" relates to a 1,2 or 3-cyclopentenyl ring, a 1, 2, 3 or 4-cyclohexenyl ring or a 1, 2, 3, 4 or 5-cycloheptenylring.

In a more preferred embodiment the functional group X may comprise proton (H), amine (—NR$^2$$_2$, where R$^2$ can be H or an alkyl chain), imino, urea ((—NH)CO(NH$_2$)), amide (—CONH$_2$)) carboxylic acid (—CO$_2$H), carboxylic acid anion (—CO$_2$), sulfonic acid (—SO$_3$H), sulfonic acid anion (—SO$_3$), methanedthionic acid (—CS$_2$H), phosphonate (—PO$_3$R$^3$$_2$ with R$^3$ is an alkyl chain), phosphonic acid (—PO$_3$H$_2$), sulfide (—S—), phosphine (—PR$^4_2$, where R$^4$ can be H or an alkyl chain), pyridine, pyrazine, halogens (Cl, Br or I), and the like.

More complex functional groups may include:

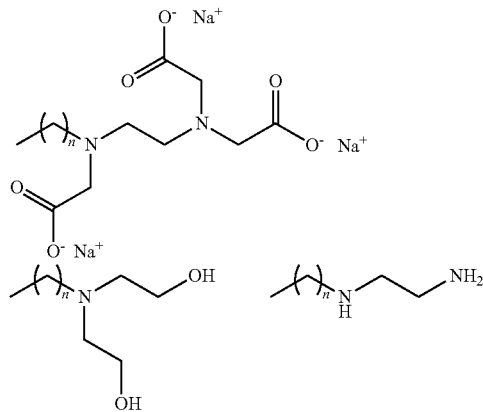

In an even more preferred embodiment the at least one functionalising agent may be selected from a group comprising:

- (3-Aminopropyl)trimethoxysilane, N1-(3-Trimethoxysilylpropyl)diethylenetriamine, N-[3-(Trimethoxysilyl)propyl]ethylenediamine, N-(2-Aminoethyl)-3-aminopropylsilanetriol, (N,N-Dimethylaminopropyl)trimethoxysilane, 3-[Bis(2-hydroxyethyl)amino]propyl-triethoxysilane, 3-Aminopropylsilanetriol, N-(Trimethoxysilylpropyl)-ethylenediaminetriacetate, tripotassium salt;
- 1-[3-(Trimethoxysilyl)propyl]urea;
- Carboxyethylsilanetriol sodium salt, N-(Trimethoxysilylpropyl)ethylene-diaminetriacetate, tripotassium salt;
- 3-(Trihydroxysilyl)-1-propanesulfonic acid;
- (2-diethylphosphatoethyl)triethoxysilane, 3-(trihydroxysilyl)propyl methylphosphonate;
- Bis[3-(triethoxysilyl)propyl] tetrasulfide, Bis[3-(triethoxysilyl)propyl]disulphide;
- (2-Dicyclohexylphosphinoethyl)triethoxysilane, 2-(Diphenylphosphino)ethyl-triethoxysilane;
- 2-(4-pyridylethyl)triethoxysilane, 3-(4-pyridylethyl)thiopropyltrimethoxysilane;
- (3-Bromopropyl)trimethoxysilane.

The most preferred functionalising agent are of the following structures:

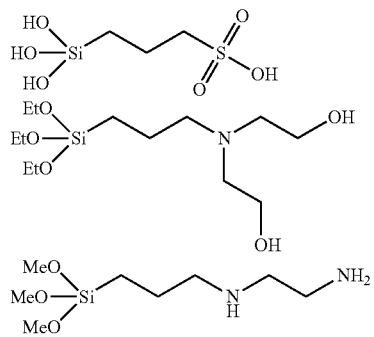

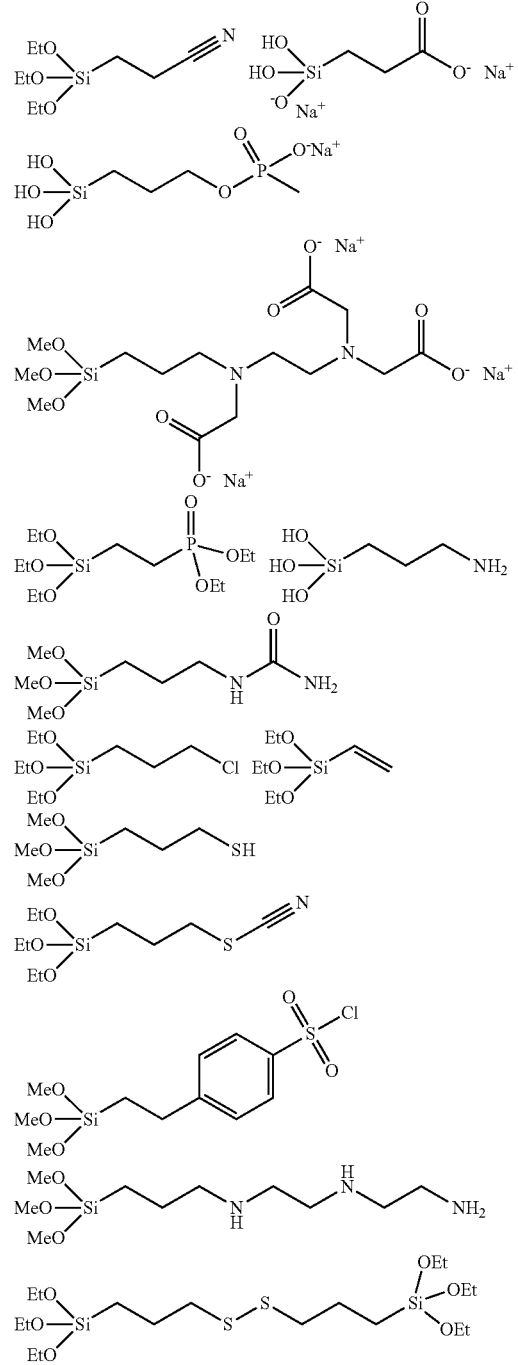

As pointed out above, the pH value of the reaction mixture is important in the present method. This is due to the fact that the key parameter for the fast reaction is the pH-controlled condensation rate, which allows the mesostructure to be formed immediately while the co-condensation of the silane moieties occur. The silica precursor used is a sodium silicate. They are used as a solution of 27 wt.-% SiO$_2$ and 14 wt.-% NaOH, and are therefore highly alkaline. The change in the pH in the present system is controlled by the buffered solution. The reaction thus occurs in a range from pH 2 to 8. The buffer system used may be sodium citrate/citric acid (pH range 2.5-7.9), sodium acetate/acetic acid (pH range 3.2-6.2), or sodium phosphate dibasic/citric acid (pH range 3-8).

The sequence of mixing the precursors may vary.

Thus, in a first embodiment, the sequence of mixing the precursor agents or their respective solution can be as follows:
preparing alkali silicate solution;
preparing the buffered solution of pore structure directing agent;
adding the functionalising agent to the buffered pore structure directing agent solution, and
mixing the functionalising agent—buffered pore structure directing agent solution and the alkali silicate solution.

In a second embodiment, the sequence of mixing the precursor agents or their respective solutions can be as follows:
preparing alkali silicate solution;
preparing the buffered solution of pore structure directing agent;
adding the functionalising agent to the alkali silicate solution, and
adding the functionalising agent—alkali silicate solution to the buffered pore structure directing agent solution and mixing.

In a third embodiment, the sequence of mixing the precursor agents or their respective solutions can be as follows:
preparing alkali silicate solution;
preparing the buffered solution of pore structure directing agent;
mixing the functionalising agent, the buffered pore structure directing agent solution, and the alkali silicate solution.

It was found that, depending on the addition of the solutions, different results are obtained. Due to the different nature of the organic functional groups of the functionalising agent, different chemical interactions with either the SDA or the sodium silicate may occur.

The molar ratio of alkali silicate to the functionalising agent (i.e. $SiO_2$:organosilane ratio) is between 1 and 20, preferably between 5 and 15, more preferably between 5 and 10, in particular between 6 and 8, such as 7.

In an embodiment of the present method the at least three precursors are mixed and reacted at a temperature between 20° C. and 60° C., more preferably between 20° C. and 50° C., most preferably between 20° C. and 30° C. or 20 and 25° C., preferably at room temperature. If the method is carried out in batch mode the at least three precursors are mixed for a time period of 5 to 30 min, preferably 5 to 20 min, with a stirring rate between 50 and 400 rpm In case the present method is run in a continuous fashion or mode the reaction takes place immediately upon mixing.

In a variant of the present method the solid reaction product is allowed to age at a temperature between 20° C. and 100° C., preferably between 20° C. and 60° C., more preferably between 20° C. and 50° C., most preferably between 20° C. and 30° C. For example, the reaction product is allowed to age for 0 to 48 h, preferably 1 to 24 h, more preferably 5 to 10 h at a temperature between 20 and 30° C., preferably between 20 and 25° C., such as at room temperature, whereby the solid reaction product is aged. In any case, the aging step is only required for increasing the pore size of the mesoporous particles.

The solid is separated from the solution by filtration and the separated solid is subsequently air-dried at a temperature between 50° C. and 120° C., in particular preferably at 60° C.

In a next step any pore structure directing agent present in the pores of the formed mesoporous silica particles is removed by ultra-sonication at a frequency between 20 and 60 kHz, preferably between 30 and 50 kHz for a time period of 5 to 60 min, preferably 5 to 30 min, more preferably 5 to 10 min.

Furthermore, any pore structure directing agent present in the pores of the formed mesoporous silica particles is removed by ultra-sonication at a temperature between 20 and 60° C., preferably between 20 and 50° C., more preferably between 20 and 25° C., such as at room temperature in the presence of a C1-C3 alcohol, in particular methanol.

Subsequently after removal of any pore structure directing agent the surface functionalized mesoporous silica particles are dried at 50 to 80° C., preferably at 60 to 80° C.

As mentioned above, the present method may be carried out in a batch-mode (see also Example 1 in the Example section) or in a continuous mode (see also Example 2 in the Example section).

The set up for conducting the present method in a continuous mode may comprise a synthesis section and a downstream section.

The synthesis section may comprise at least one feed tank for the silica precursor solution, at least one feed tank for the solution containing at least one pore structure directing agent (SDA), and at least one feed tank for the functionalising agent for surface functionalisation.

The synthesis section may comprise furthermore at least one static mixer for mixing the silica precursor solution and the functionalising agent, and at least one static mixer for mixing the alkali silicate—functionalising agent solution with the buffered solution of pore structure directing agent.

The downstream section comprises the devices and apparatus required for separating and cleaning the functionalized mesoporous silica particles. Specifically, the downstream section comprises at least one first filter unit for separating the surface functionalized mesoporous silica particles from the reaction mixture, at least one mixer unit for mixing the surface functionalized mesoporous silica particles with at least one extracting agent (such as methanol), at least one continuous ultrasonication unit for removing any pore structuring agent, and at least one second filter unit for separating the surface functionalized mesoporous silica particles from the extracting agent.

The downstream section may further comprise at least one washing liquid tank (for providing washing liquid such as water for washing the surface functionalized mesoporous silica particles filtered off the in the first filter unit and at least one wastewater tank for collecting the waste washing liquid leaving the first filter unit.

The downstream section may further comprise at least one tank containing the extracting agent and at least one distillation unit for separating the extracting agent from the pore structure agent after their removal from the surface functionalized mesoporous silica particles in the at least one second filter unit.

It is to be understood that the feeds and suspensions are transported in the synthesis section and downstream section using appropriate pumps.

The continuous process in the synthesis section and downstream section may comprise the following steps according to a first embodiment:
a) Providing at least one silica precursor solution in a first feed tank;
b) Providing at least one solution containing at least one pore structure directing agent (SDA) in a second tank;

c) providing at least one agent for surface functionalisation comprising at least one functionalising agent in a third tank;
d) mixing a feed of pore structure directing agent and a feed of functionalising agent in a static mixer,
e) mixing a feed of the mixture of pore structure directing agent and functionalising agent leaving the static mixer with a feed of silica precursor solution in a static mixer;
f) transferring a slurry of surface functionalized mesoporous silica particles and pore structuring agent to a first filter unit;
g) filtrating off the surface functionalized mesoporous silica particles and washing the surface functionalized mesoporous silica particles with a washing liquid (such as water);
h) transferring the surface functionalized mesoporous silica particles from the first filter unit to a mixer unit, wherein the surface functionalized mesoporous silica particles are mixed with at least extracting agent (from a feed tank);
i) transferring the suspension of surface functionalized mesoporous silica particles and extracting agent to an ultrasound unit,
j) transferring the slurry of surface functionalized mesoporous silica particles in extracting agent to a second filter unit,
k) washing the surface functionalized mesoporous silica particles with a washing liquid and filtering off the surface functionalized mesoporous silica particles; and
l) collecting the final surface functionalized mesoporous silica particles.

The above first sequence of mixing the precursor agents or their respective solution in steps a)-d) is thus accordingly as follows (see also feed sequence 1 in FIG. 2):
preparing alkali silicate solution;
preparing the buffered solution of pore structure directing agent;
adding the surface functionalisation agent to the buffered pore structure directing agent solution, and
mixing the surface functionalisation agent—buffered pore structure directing agent solution to the alkali silicate solution.

According to a second embodiment the sequence of mixing the precursor agents or their respective solutions is as follows (see also feed sequence 2 in FIG. 3):
preparing alkali silicate solution;
preparing the buffered solution of pore structure directing agent;
adding the surface functionalisation agent to the alkali silicate solution, and
adding the functionalising agent—alkali silicate solution to the buffered pore structure directing agent solution and mixing.

According to a third embodiment the sequence of mixing the precursor agents or their respective solutions is as follows (see also feed sequence 3 in FIG. 4):
preparing alkali silicate solution;
preparing the buffered solution of pore structure directing agent;
mixing the surface functionalisation agent, the buffered pore structure directing agent solution, and the alkali silicate solution.

The method according to the solution provides mesoporous silica particles with surface functionalisation with a uniform pore size in a range of 2 to 30 nm. The particles range in size from 200 nm to 100 μm. The surface area ranges from 50 to 1000 m² per gram of material.

SF-OMS synthesised via the present method as described can be used as scavengers for the removal of metals from different media. In particular, the media could be a reaction media from chemical processes comprising at least one solvent, and/or starting materials, and/or products, and/or ligands, and/or at least one metal. The solvents could be alcohols such as methanol, ethanol, propanol; tetrahydrofuran, toluene, acetonitrile, chlorobenzene, chloroform, cyclohexane, 1,2-dichloroethane, dichloromethane, N,N-dimethylacetamide, N,N-dimethylformamide, 1,4-dioxane, 2-ethoxyethanol, ethylene glycol, formamide, hexane, 2-methoxyethanol, methylbutylketone, N-methylpyrrolidone, Nitromethane, pyridine, sulfolane, tetralin, xylene, and dimethyl sulfoxide. The starting materials, products and ligands could be molecules having functional groups such as alcohols, and/or ketones, and/or aldehydes, and/or amines, and/or alkanes, and/or alkenes, and/or alkynes, and/or halides, and/or thiols, and/or esters, and/or ether, and/or carboxylic acids, and/or amide, and/or benzene ring, and/or phosphines, and/or phosphonic acids, and/or phosphonates, and/or imines. The metals could be titanium (Ti), and/or vanadium (V), and/or chromium (Cr), and/or manganese (Mn), and/or iron (Fe), and/or cobalt (Co), and/or niquel (Ni), and/or copper (Cu), and/or zinc (Zn), and/or ruthenium (Ru), and/or rhodium (Rh), and/or palladium (Pd), and/or osmium (Os), and/or iridium (Ir), and/or platinum (Pt), and/or silver (Ag), and/or gold (Ag).

The scavenging process involving the SF-OMS synthesised via the method described in this solution consists of (1) the addition of the metal scavenger to the media containing the metal or metals, (2) the capture of the metals by chemical bonding with the functional groups of SF-OMS, and (3) the filtration of the scavenger-metal composite from the media. The capture of the metal can be carried out at a temperature between room temperature and the boiling point of the solvent of the media.

SF-OMS synthesised via the present method as described can be used as solid catalysts directly. Additionally, they can be used as catalyst supports. The immobilisation of catalytic species on the SF-OMS materials consists of (1) the addition of the SF-OMS material to a solution containing the catalytic species, (2) the stirring of the slurry, (3) the filtration of the resulting solid, (4) the drying of the solid, and (5) an optional thermal treatment (oxidation or reduction).

The resulting solid catalysts can be used in chemical transformations, including acid-catalysed reactions, such as esterifications, etherification, dehydration, oxidation and acetylation reactions; base-catalysed reactions, such as aldol and Knoevenagel condensations, as well as Michael additions; enantioselective additions; and Diels-Alder reactions. Furthermore, FOMS have also been used as catalyst supports for the immobilisation of stabilisation of organometallic catalytic species, metal nanoparticles and enzymes. The resulting immobilised catalysts have been used in reactions such as C—C bond formation reactions, selective oxidations, selective hydrogenations, Knoevenagel condensations and enantioselective nucleophilic additions.

BRIEF DESCRIPTION OF THE DRAWINGS

The solution is explained in more detail by means of the following examples with references to the figures.

DETAILED DESCRIPTION

Figure 1A:
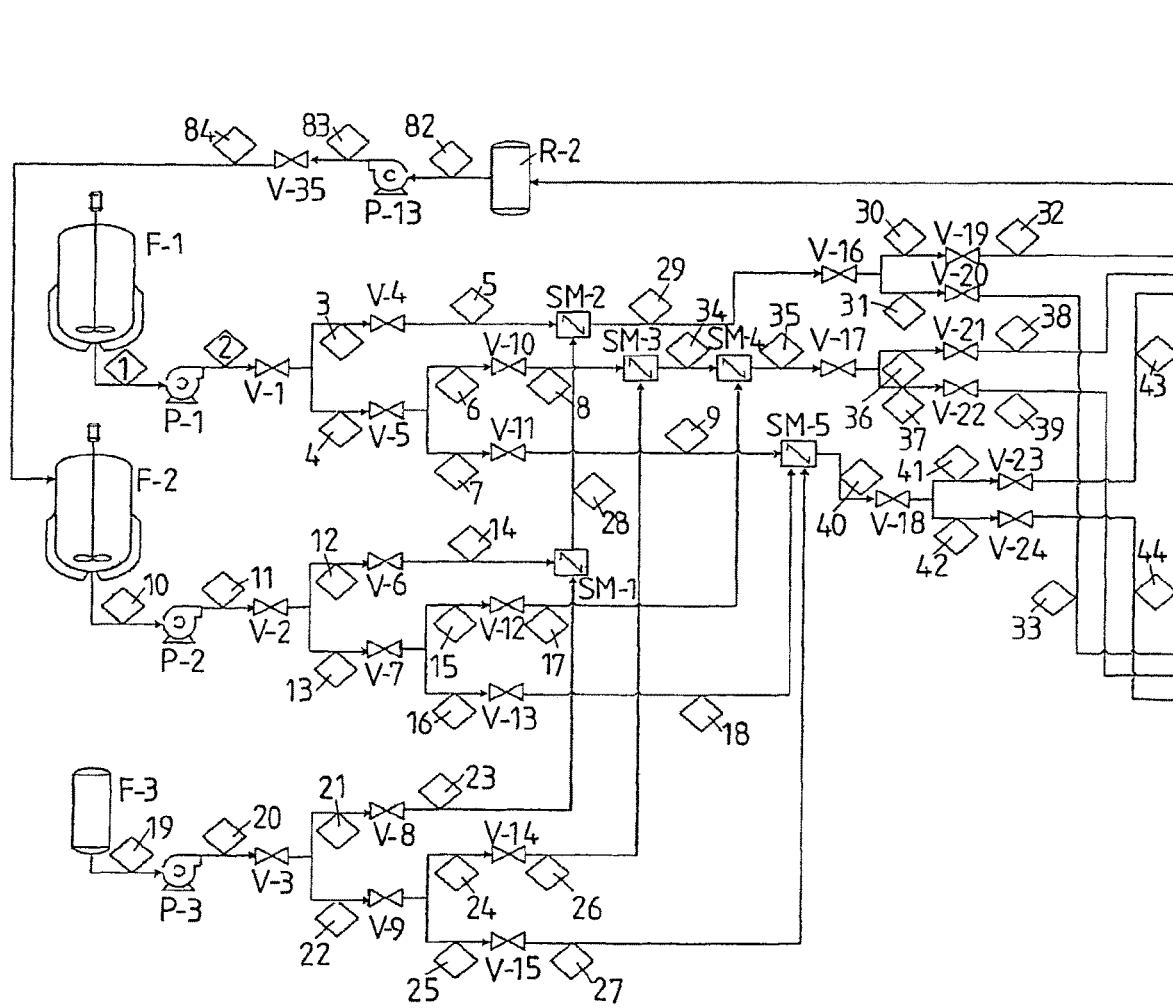
FIG. 1 show a process flow diagram for the continuous production of surface functionalized mesoporous silica particles.
Figure 1B:
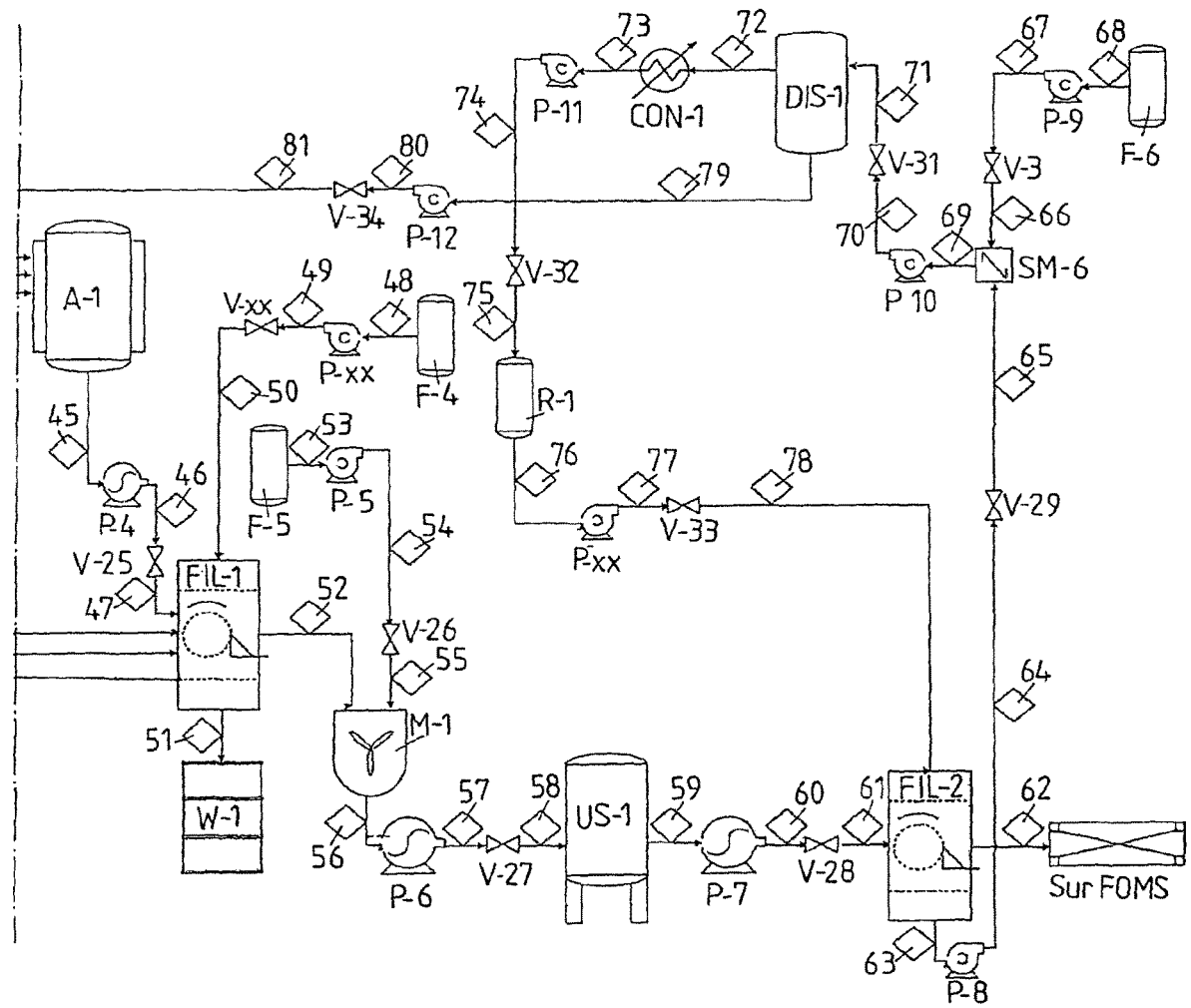

The scheme of FIG. 1 provides a conceptual process flow diagram for a continuous production of surface functionalized mesoporous silica particles. The set up comprise a synthesis section (left side) and a downstream section (right side).

The synthesis section comprises one feed tank F-1 for the silica precursor solution, one feed tank F-2 for the solution containing the pore structure directing agent (SDA), and one feed tank F-3 for the functionalising agent for surface functionalisation.

The synthesis section comprises furthermore several static mixers SM-1, SM-2, SM-3 for mixing the precursors.

The downstream section comprises the devices and apparatus required for aging, separating and cleaning the functionalized mesoporous silica particles. Specifically, the downstream section comprises an aging tank A-1, one first filter unit FIL-1 for separating the surface functionalized mesoporous silica particles from the reaction mixture, one mixer unit M-1 for mixing the surface functionalized mesoporous silica particles with an extracting agent (such as methanol), one continuous ultrasonication unit US-1 for removing any pore structuring agent, and one second filter unit FIL-2 for separating the surface functionalized mesoporous silica particles from the extracting agent.

The downstream section further comprises one washing liquid tank F-4 (for providing washing liquid such as water for washing the surface functionalized mesoporous silica particles filtered off the in the first filter unit FIL-1) and one wastewater tank W-1 for collecting the waste washing liquid leaving the first filter unit FIL-1.

The downstream section further comprises one tank F-5 containing the extracting agent and one distillation unit DIS-1 for separating the extracting agent from the pore structure agent after their removal from the surface functionalized mesoporous silica particles in the second filter unit FIL-2.

Pumps P-1, P-2, P-3, P-4, P-5 are used for transporting the feeds and suspensions in the synthesis section and downstream section.

Figure 2A:
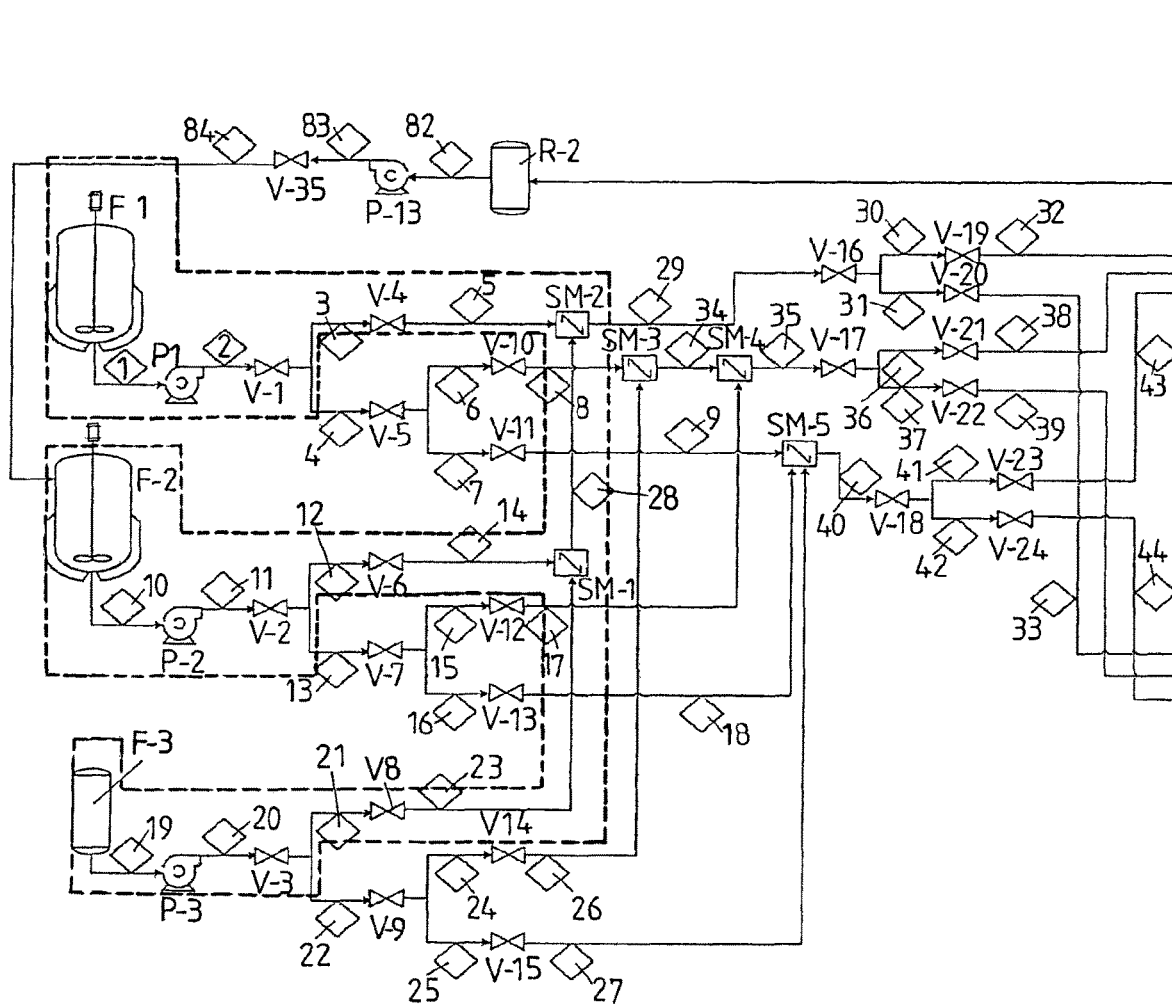
FIG. 2 show a process flow diagram for the continuous production of surface functionalized mesoporous silica particles according to a first feed sequence.
Figure 2B:
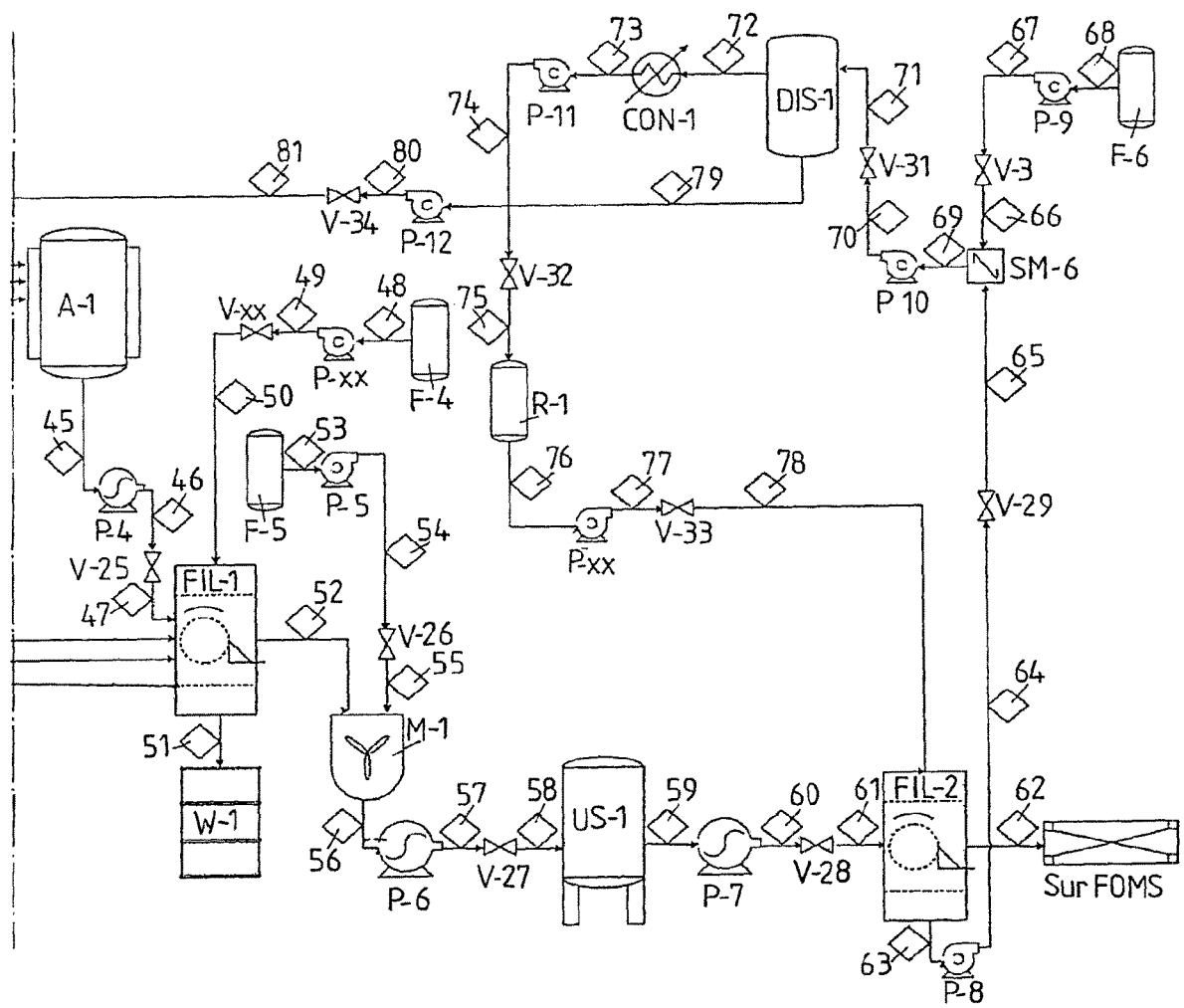
Figure 3:
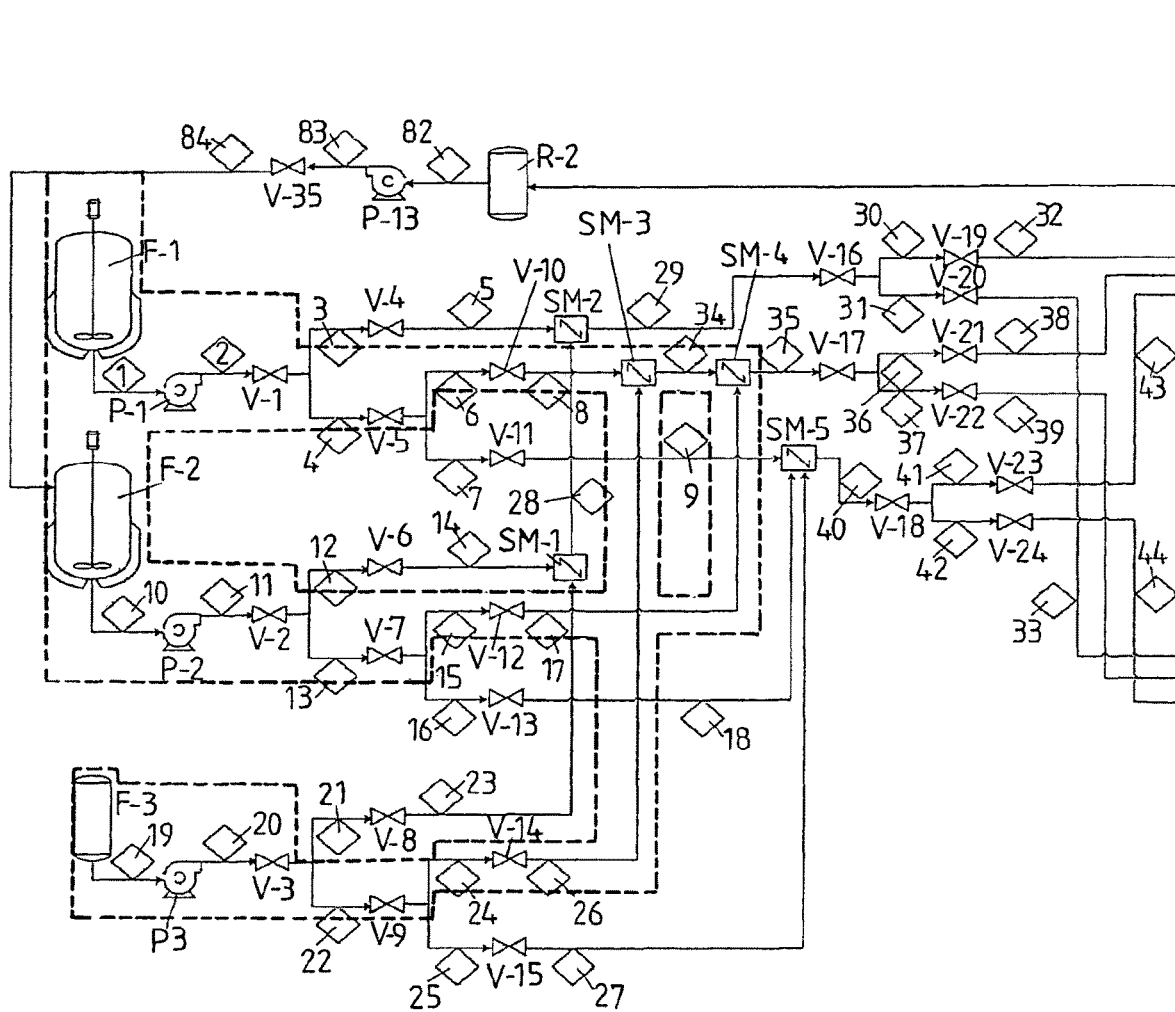
FIG. 3 show a process flow diagram for the continuous production of surface functionalized mesoporous silica particles according to a second feed sequence.
Figure 3B:
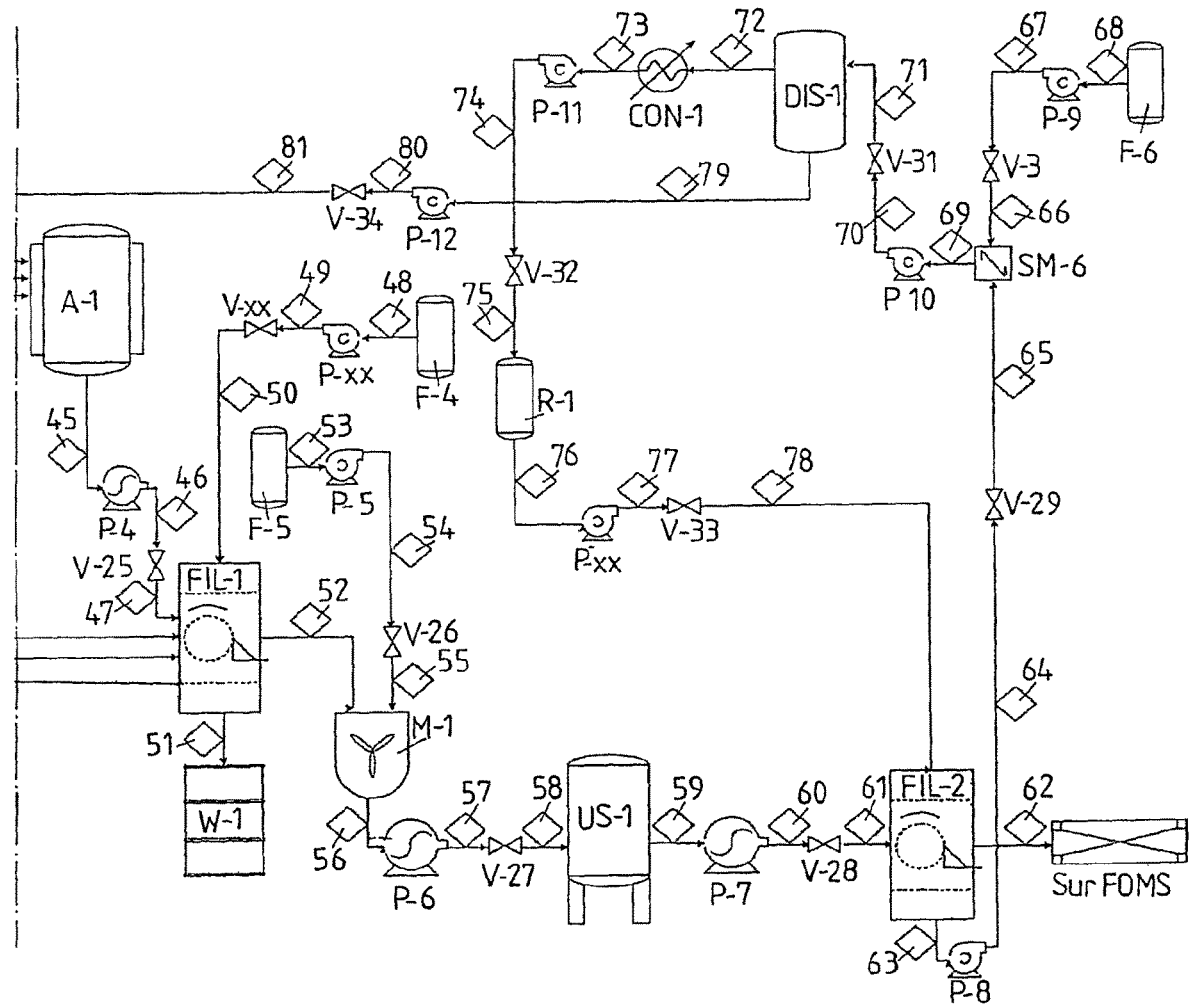
Figure 4A:
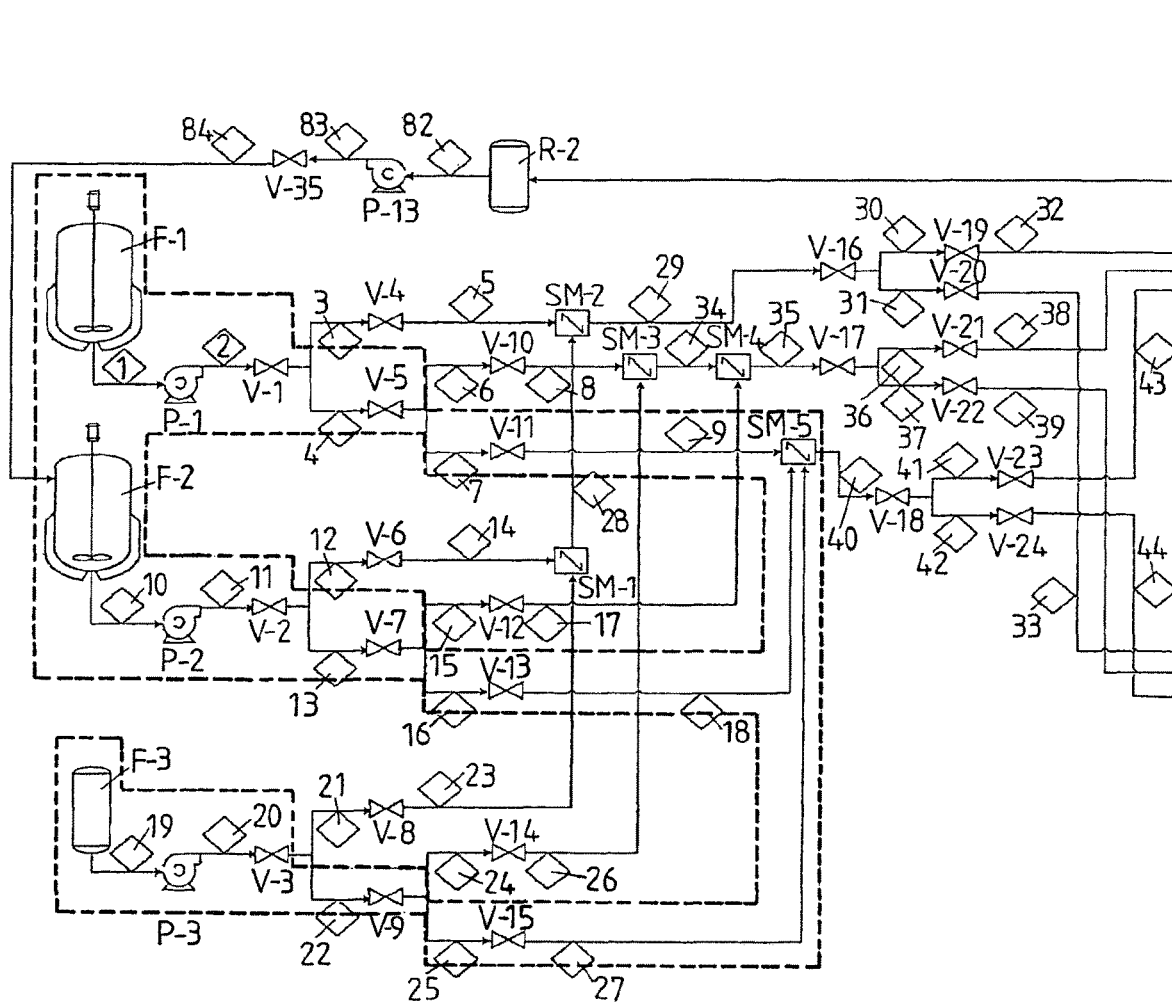
FIG. 4 show a process flow diagram for the continuous production of surface functionalized mesoporous silica particles according to a third feed sequence.
Figure 4B:
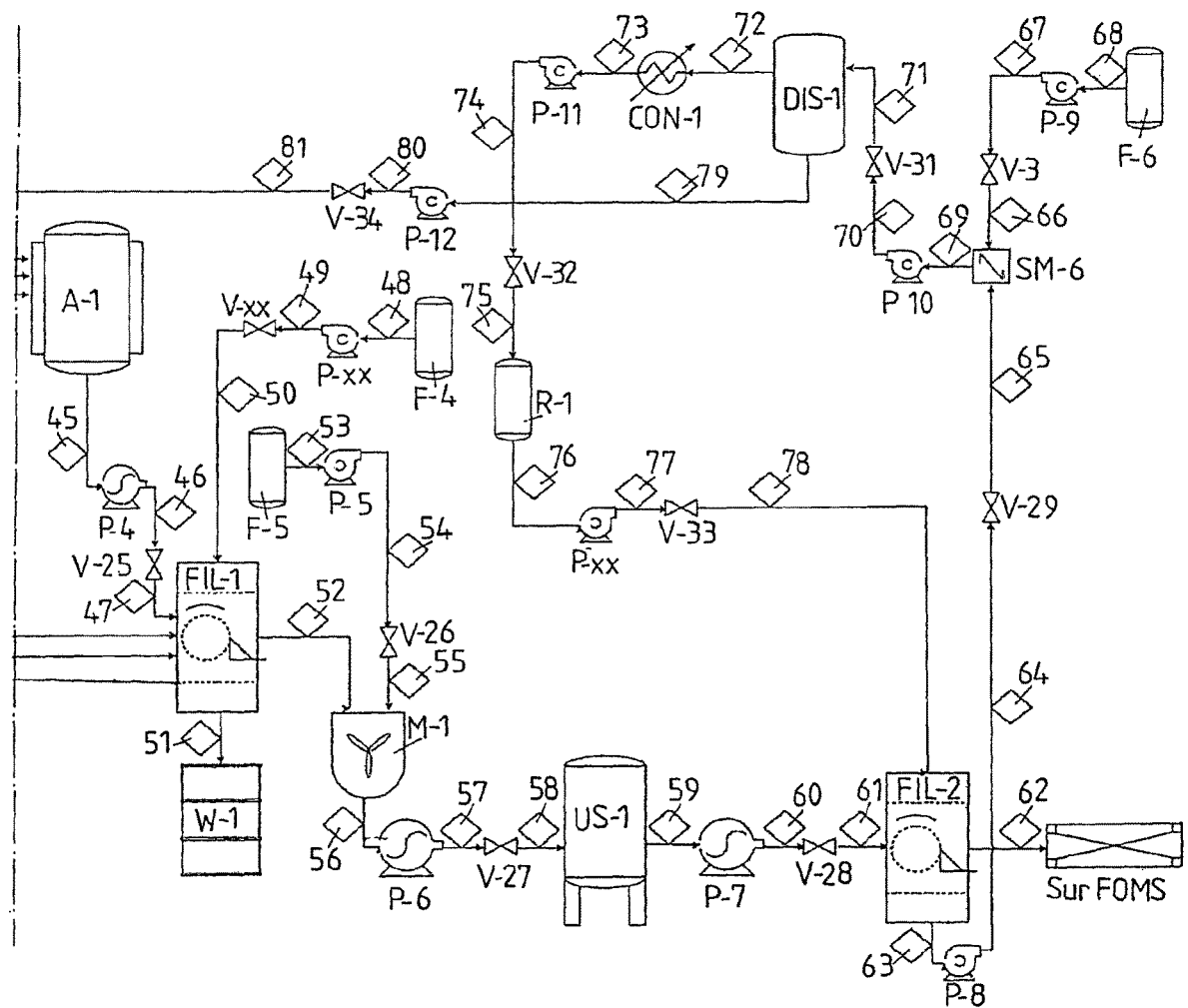

The continuous process in the synthesis section and downstream section is carried out applying the following steps:
1. The feed solutions are prepared in tanks F-1, F-2 and F-3.
2. Mixing of feed solutions is done in one of three possible ways:
   a. Solutions from F-2 (SDA) and F-3 (functionalising agent) are mixed in static mixer SM-1, and this is then mixed with solution from F-1 (sodium silicate) (first feed sequence as shown in FIG. 2)
   b. Solutions from F-1 (sodium silicate) and F-3 (functionalising agent) are first mixed in static mixer SM-3, and this is then mixed with solution from F-2 (SDA) in static mixer SM-4 (second feed sequence as shown FIG. 3)
   c. Solutions form F-1 (sodium silicate), F-2 (SDA) and F-3 (functionalising agent) are mixed in SM-5 (third feed sequence as shown FIG. 4)
3. The slurry consisting of surface functionalized ordered mesoporous silica (SF-OMS)-SDA composite in water (streams coming from SM-1, SM-4 and SM-5) are treated in one of two possible ways:
   a. Slurry is aged for a period of time and then filtered, washed and dried in FIL-1
   b. Slurry is filtered, washed and dried in FIL-1 without aging
4. The filtered solid is mixed in mixer M-1 with the extracting agent (methanol) and ultrasonicated in US-1 to remove the SDA
5. The slurry consisting of surface functionalized ordered mesoporous silica (SF-OMS) suspended in a solution of methanol and SDA is filtered, washed and dried in FIL-2
6. The final solid product is collected (SF-OMS)
7. Recycling of extracting agent and SDA takes place as follows:
   a. The filtrate (extracting agent and SDA solution) from FIL-2 is mixed with water in SM-4 and the methanol is separated from the water and SDA via distillation
   b. The extracting agent is condensed and recycled into R-1 to be used again in FIL-2
   c. The water-SDA solution is recycled into R-2 to be used again in F-2

Example 1: Batch Synthesis

Material Synthesis
1. Dissolve 4 g P123 in 107.5 ml DIW (SDA)
2. Add 3.684 g citric acid and 2.540 g sodium citrate (buffer)
3. Stir for 24 h at 25° C.
4. Add (3-Aminopropyl)triethoxysilane (APTES) to buffered P123 solution (calculated based on an $SiO_2$:APTES molar ratio of ~7)
5. Prepare sodium silicate solution with 10.4 g sodium silicate (27% $SiO_2$) and 30 g DIW
6. Add sodium silicate solution to buffered P123/APTES solution and stir for 5 min at 25° C.

OR
1. Dissolve 4 g P123 in 107.5 ml DIW (SDA)
2. Add 3.684 g citric acid and 2.540 g sodium citrate (buffer)
3. Stir for 24 h at 25° C.
4. Prepare sodium silicate solution with 10.4 g sodium silicate (27% $SiO_2$) and 30 g DIW
5. Add (3-Aminopropyl)triethoxysilane (APTES) to sodium silicate solution (calculated based on an $SiO_2$:APTES molar ratio of ~7)
6. Add sodium silicate/APTES solution to buffered P123 solution and stir for 5 min at 25° C.

OR
1. Dissolve 4 g P123 in 107.5 ml DIW (SDA)
2. Add 3.684 g citric acid and 2.540 g sodium citrate (buffer)
3. Stir for 24 h at 25° C.
4. Prepare sodium silicate solution with 10.4 g sodium silicate (27% $SiO_2$) and 30 g DIW
5. Mix both solutions with (3-Aminopropyl)triethoxysilane (APTES, calculated based on an $SiO_2$:APTES molar ratio of ~7) and stir for 5 min at 25° C.

Aging and Filtration
1. Age for 24 h at 25° C. (optional)
2. Filter the slurry under vacuum
3. Wash the solid with 500 ml DIW
4. Filter again
5. Dry at 60° C. overnight Template Removal
1. Suspend 100 mg in 100-500 ml methanol and immerse in an ultrasound bath at 25° C. and 50 kHz for 5 min
2. Filter under vacuum
3. Wash with 500 ml ethanol
4. Dry at 80° C. overnight Example 2: Continuous Process Material Synthesis (Synthesis Section)
1. Dissolve 1000 g P123 in 26875 ml DIW (this is the template) in F-2
2. Add 921 g citric acid and 653 g sodium citrate (buffer) in F-2
3. Mix this solution with 250 ml APTES to buffered P123 solution (calculated based on an $SiO_2$:APTES molar ratio of ~7) in SM-1
4. Stir for 24 h at 25° C. in F-2
5. Prepare sodium silicate solution with 2600 g sodium silicate (27% $SiO_2$) and 7500 g DIW in F-1
6. Mix both solutions in static mixer SM-2 (see feed sequence 1, FIG. 2)

OR

1. Dissolve 1000 g P123 in 26875 ml DIW (this is the template) in F-2
2. Add 921 g citric acid and 653 g sodium citrate (buffer) in F-2
3. Stir for 24 h at 25° C. in F-2
4. Prepare sodium silicate solution with 2600 g sodium silicate (27% $SiO_2$) and 7500 g DIW in F-1
5. Mix this solution with 250 ml APTES to sodium silicate solution (calculated based on an $SiO_2$:APTES molar ratio of ~7) in SM-3
6. Mix both solutions in static mixer SM-4 (see feed sequence 2, FIG. 3)

OR

1. Dissolve 1000 g P123 in 26875 ml DIW (this is the template) in F-2
2. Add 921 g citric acid and 653 g sodium citrate (buffer) in F-2
3. Stir for 24 h at 25° C. in F-2
4. Prepare sodium silicate solution with 2600 g sodium silicate (27% $SiO_2$) and 7500 g DIW in F-1
5. Mix the three solutions in static mixer SM-5 (see feed sequence 3, FIG. 4)

Template Removal (Downstreaming Section)
1. Age for 24 h at 25° C. in aging tank A-1 (optional)
2. Filter the slurry/wash with water in rotary vacuum drum filter FIL-1
3. Suspend slurry in the equivalent of 100-500 ml methanol/100 mg slurry and ultrasonicate at 25° C. and 50 kHz in continuous ultrasound bath US-1
4. Filter the slurry/wash with ethanol in rotary vacuum drum filter FIL-2
5. Collect the dried solid material in SF-OMS Recycling of Extracting Agent (in this Case Ethanol) and Pore Templating Agent (in this Case P123) (Downstreaming Section)
1. Pump filtrate consisting of a solution of P123 and ethanol to static mixer SM-4
2. Mix P123-ethanol with water from F-6 for separation
3. Pump P123-ethanol-water solution to distillation unit DIS-1 to separate P123-water and ethanol
4. Condense ethanol in CON-1 and recycle to FIL-2
5. Recycle P123-water solution to F-2

| Reference signs | |
|---|---|
| Equipment number | Description |
| F-1 | Jacketed silica source solution feed tank |
| F-2 | Jacketed templating agent solution feed tank |
| F-3 | Jacketed functionalising agent solution feed tank |
| F-4 | Washing liquid feed tank (water) |
| F-5 | Extracting agent feed tank |
| F-6 | Dilution water tank |
| R-1 | Recycled washing liquid feed tank (extracting agent) |
| R-2 | Recycled structure-directing agent solution tank |
| A-1 | Jacketed aging tank |
| P-1 | Silica source solution rotary pump |
| P-2 | Structure-directing agent solution rotary pump |
| P-3 | Functionalising agent solution rotary pump |
| P-4 | SurFOMS/structure-directing agent composite suspension screw pump |
| P-5 | Extracting agent rotary pump |
| P-6 | SF-OMS slurry screw pump |
| P-7 | SF-OMS slurry screw pump |
| P-8 | Filtrate rotary pump |
| P-9 | Dilution water rotary pump |
| P-10 | Structure-directing agent/extracting agent solution rotary pump |
| P-11 | Extracting agent condensate rotary pump |
| P-12 | Structure-directing agent solution rotary pump |
| P-13 | Recycled structure-directing agent solution rotary pump |
| V-1 to V-35 | Valves |
| SM-1 to, SM-6 | Static mixers |
| FIL-1, FIL-2 | Continuous drum filters/driers |
| W-1 | Wastewater tank |
| M-1 | Mixer |

| Reference signs | |
|---|---|
| US-1 | Continuous ultrasonication unit |
| DIS-1 | Distillation column for extracting agent/structure-directing agent separation |
| CON-1 | Condenser to condense extracting agent |

| Stream number | Stream description |
|---|---|
| 1-9 | Silica source feed |
| 10-18 | Structure directing agent (SDA) feed |
| 19-27 | Functionalizing agent feed |
| 28 | Templating agent and functionalizing agent mixture (feed sequence #1) |
| 29-33 | Slurry: surface functionalized ordered mesoporous silica (SF-OMS)-templating agent composite in water (feed sequence #1) |
| 34 | Silica source and functionalizing agent mixture (feed sequence #2) |
| 35-39 | Slurry: surface functionalized ordered mesoporous silica (SF-OMS)-templating agent composite in water (feed sequence #2) |
| 40-44 | Slurry: surface functionalized ordered mesoporous silica (SF-OMS)-templating agent composite in water (feed sequence #3) |
| 45-47 | Aged slurry |
| 48-50 | Washing liquid feed (water) |
| 51 | Filtrate: wastewater |
| 52 | Solid: SF-OMS/templating agent composite |
| 53-55 | Extracting agent feed (methanol) |
| 56-58 | Suspension: SF-OMS/templating agent composite suspended in extracting agent |
| 59-61 | Slurry: SF-OMS in extracting agent/templating agent solution |
| 62 | SF-OMS (final product) |
| 63-65 | Filtrate: extracting agent/templating agent solution |
| 66-68 | Water feed (for dilution and separation of extracting agent and templating agent) |
| 69-71 | Solution containing templating agent, extracting agent and water |
| 72 | Vaporized extracting agent |
| 73-765 | Condensed extracting agent for recycling |
| 76-78 | Recycled washing liquid feed (extracting agent) |
| 79-84 | Recycled templating agent solution in water |

The invention claimed is:

1. Method for obtaining mesoporous silica particles with surface functionalisation comprising the steps of
   a) providing solutions of at least three precursor agents, wherein the at least three precursor agents are selected from a group containing:
   at least one alkali silicate solution,
   at least one solution containing at least one pore structure directing agent (SDA), wherein the at least one pore structure directing agent is a non-ionic polymeric pore structure directing agent from the group of poly(alkylene oxide)triblock copolymer, wherein the at least one pore structuring agent is provided in a buffer solution with a pH between 2 and 8, wherein the buffer solution is selected from a sodium citrate/citric acid buffer, a $Na_2HPO_4$/citric acid buffer, a HCl/sodium citrate buffer or a $Na_2HPO/NaH_2PO_4$ buffer, and
   at least one functionalising agent for surface functionalisation;
   wherein the at least one functionalising agent is of the following general structure:

$Y_3Si$—$(CH_2)_n$—X    (I)

wherein
   Y is $OR^1$, wherein R can be a H or an alkyl chain, optionally a $C_1$-$C_{20}$ alkyl chain,
   n is 1 to 20,
   X is selected from a group comprising H, a linear or branched substituted or non-substituted $C_1$-$C_{30}$-alkyl or a cyclic substituent in form of a substituted or non-substituted $C_5$-$C_{20}$-cycloalkyl, a substituted or non-substituted $C_5$-$C_{20}$-aryl, wherein in each case one or multiple carbon atoms can be substituted by one or multiple oxygen atoms, sulphur atoms, substituted nitrogen atoms, double bonds and/or by one or multiple groups of the type —C(O)O—, —OC(O)—, —C(O)—)—, —NHC(O)O—, —OC(O)NH— and/or —OC(O)O—, and/or can be functionalized by one or multiple hydroxyl groups, amino groups and/or mercapto groups,
   wherein the pH of the mixture is adjusted to a range between 2 and 8 in a buffered system;
   b) Mixing the precursor solutions thereby allowing a reaction to take place at a temperature between 20 and 60° C., optionally between 20° C. and 25° C., whereby surface functionalized mesoporous silica particles as solid reaction product are formed;
   c) Separating the surface functionalized mesoporous silica particles from the reaction mixture by centrifugation or filtration and optionally washing the surface functionalized mesoporous silica;
   d) Removing any pore structuring directing agent present in the pores of the formed surface functionalized mesoporous silica particles by ultrasonication in a $C_1$-$C_3$ alcohol at a temperature between 20° C. and 60° C., optionally between 20° C. and 35° C.;
   e) followed by separation by centrifugation or filtration, washing and drying of the surface functionalized mesoporous silica particles.

2. Method according to claim 1, wherein no organic solvent is used in the reaction.

3. Method according to claim 1, wherein the at least one alkali silica precursor solution comprises an aqueous sodium silicate solution.

4. Method according to claim 1, wherein the at least one alkali silicate solution comprises the alkali silicate in an amount between 20 and 40 wt % (based on the total solution) of $SiO_2$, and 5-30 wt of NaOH.

5. Method according to claim 1, wherein the at least one pore structuring directing agent is $HO(CH_2CH_2O)_{20}(CH_2CH(CH_3)O)_{70}(CH_2CH_2O)_{20}H$ (Pluronic P123).

6. Method according to claim 1, wherein the group X is selected from a group comprising H, substituted and non-substituted $C_1$-$C_{12}$-alkyl and substituted and non-substituted $C_3$-$C_7$-cycloalkyl.

7. Method according to claim 1, wherein the buffer system provides a pH between 2 and 8, optionally 5 to 7 and is a sodium citrate/citric acid buffer.

8. Method according to claim 1, wherein the at least three precursors are mixed and reacted at a temperature between 20 and 25° C. in a batch mode or in a continuous mode.

9. Method according to claim 1, wherein the reaction mixture is allowed to age for 12 to 48 h, optionally 24 h at a temperature between 20° C. and 100° C.

10. Method according to claim 1, wherein the surface functionalized mesoporous silica particles are dried in air at a temperature between 50° C. and 70° C., optionally at 60° C.

11. Method according to claim 1, wherein any pore structure directing agent present in the pores of the formed mesoporous silica particles is removed in a $C_1$-$C_3$ alcohol by ultra-sonication at a frequency between 20 and 60 kHz for a time period of 5 to 20 min, optionally 5 to 10 min.

12. Method according to claim 11, wherein any pore structure directing agent present in the pores of the formed mesoporous silica particles is removed by ultra-sonication at a temperature between 20 and 30° C., optionally between 20 and 25° C., such as at room temperature in the presence of a alcohol.

13. Method according to claim 1, wherein after removal of any pore structuring directing agent the surface functionalized mesoporous silica particles are dried at 50 to 80° C., optionally at 60 to 80° C.

14. Method according to claim 1, wherein the group X is selected from the group comprising proton (H), amine ($-NR^2_2$, where $R^2$ can be H or an alkyl chain), imino, urea (($-NH)CO(NH_2$)), amide ($-CONH_2$)) carboxylic acid ($-CO_2H$), carboxylic acid anion ($-CO_2$), sulfonic acid ($-SO_3H$), sulfonic acid anion ($-SO_3$), methanedthionic acid ($-CS_2H$), phosphonate ($-PO_3R^3_2$ with $R^3$ is an alkyl chain), phosphonic acid ($-PO_3H_2$), sulfide ($-S-$), phosphine ($-PR^4_2$, where $R^4$ can be H or an alkyl chain), pyridine, pyrazine, halogens (Cl, Br or I).

15. Method according to claim 1, wherein group X is selected from:

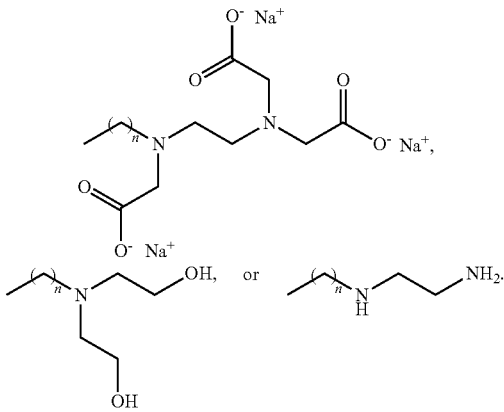

* * * * *